(12) United States Patent
Milholland

(10) Patent No.: US 11,906,479 B2
(45) Date of Patent: Feb. 20, 2024

(54) PORTABLE SELF-CONTAINED PRESSURE TESTING MANIFOLD AND ASSOCIATED METHODS

(71) Applicant: Fermi Research Alliance, LLC, Batavia, IL (US)

(72) Inventor: Roger A. Milholland, Sheridan, IL (US)

(73) Assignee: Fermi Research Alliance, LLC, Batavia, IL (US)

(*) Notice: Subject to any disclaimer, the term of this patent is extended or adjusted under 35 U.S.C. 154(b) by 685 days.

(21) Appl. No.: 16/916,437

(22) Filed: Jun. 30, 2020

(65) Prior Publication Data

US 2021/0404926 A1 Dec. 30, 2021

(51) Int. Cl.
   *G01N 3/12* (2006.01)
   *G01M 3/26* (2006.01)

(52) U.S. Cl.
   CPC ............ *G01N 3/12* (2013.01); *G01M 3/26* (2013.01); *G01N 2203/0048* (2013.01)

(58) Field of Classification Search
   CPC ........ G01M 3/26; G01M 3/3209; G01M 3/00; G01N 2203/0048; G01N 3/12; G01N 21/37; G01N 30/7246; G01N 2035/1044; G01N 2203/0042; G01N 2203/0044; G01N 2203/0611
   See application file for complete search history.

(56) References Cited

U.S. PATENT DOCUMENTS

| | | |
|---|---|---|
| 2,449,556 A | 9/1948 | Kirkley |
| 3,577,768 A | 5/1971 | Aprill, Jr. et al. |
| 5,304,757 A | 4/1994 | Hensel |
| 5,795,995 A | 8/1998 | Shimaoka et al. |
| 6,981,422 B1 | 1/2006 | Comardo |
| 9,429,493 B2 | 8/2016 | Halliwill |
| 2012/0291457 A1 | 11/2012 | Brown et al. |
| 2014/0326050 A1* | 11/2014 | Mann ............... G01M 3/04 73/37 |

(Continued)

FOREIGN PATENT DOCUMENTS

RU 147090 U1 * 10/2014

*Primary Examiner* — John Fitzgerald
*Assistant Examiner* — Truong D Phan
(74) *Attorney, Agent, or Firm* — Grable Martin, PLLC; William A. Harding

(57) ABSTRACT

A portable, case-enclosed pressure test manifold, configured to support both pneumatic and hydrostatic pressure testing, and comprising a downstream fluid path (e.g., a system test gauge, a ball valve, a system test port, a system relief valve, and other components/piping) and an upstream fluid path (e.g., a low-pressure gauge, a high-pressure gauge, and other components/piping). A regulator and/or the ball valve selectively operate the downstream fluid path, defining a hydrostatic pressure testing path, to receive a liquid; and the upstream fluid path in combination with the downstream fluid path, defining a pneumatic pressure testing path, to receive a gas. Manifold components are pressure rated based on use and are ASME Code B31.3 compliant. A flexible hose connects with either of the pneumatic pressure testing path and the hydrostatic pressure testing path of the manifold. The case includes parking receptables and a carrying handle configured to stow the hose during transport.

20 Claims, 14 Drawing Sheets

(56) References Cited

U.S. PATENT DOCUMENTS

| | | |
|---|---|---|
| 2017/0363525 A1 | 12/2017 | Daley et al. |
| 2019/0339155 A1 | 11/2019 | Rebich |
| 2020/0018444 A9 | 1/2020 | Sharp |
| 2021/0156776 A1* | 5/2021 | Smalley .................. G01N 3/12 |

* cited by examiner

PRIOR ART

| Component | | Material 110 | Allowable Stress [psi] 130 |
|---|---|---|---|
| Pipe | 122 | 304/304L S.S. | 16,700 |
| Fittings | 124 | 304/304L S.S. | 16,700 |
| Braided Flex hose | 126 | 316L S.S. | 16,700 |

PRIOR ART

| PIPE ~210 | PRESSURE RATING (PSIG) ~220 | MINIMUM REQUIRED WALL THICKNESS (IN) ~230 | NOMINAL WALL THICKNESS (IN) ~240 |
|---|---|---|---|
| .54" OD X .088" WALL | 3000 | 0.056 | 0.088 |

PRIOR ART

CRANE Technical Paper N-410-Discharge of fluids from piping systems

| | | Volumetric flow rate (ft^3/min) | Mass flow rate (lbs/h) |
|---|---|---|---|
| $q'_m = 678 \cdot Y \cdot d^2 \cdot \sqrt{\dfrac{\Delta P \cdot P'}{K \cdot T \cdot S_g}}$ | | 970.61 | 4361.14 |
| ΔP | Differential Pressure, psi | 500 | |
| P' | Absolute Pressure, psi | 514.7 | |
| Sg | Specific gravity of gas relative to air | 1 | |
| T | Absolute Temperature, °R | 530 | |
| d | Internal Diameter of Pipe, in | 0.364 | |
| D | Internal Diameter of Pipe, ft | 0.0303333 | |
| f | Friction factor, Moody Chart | 0.032 | |
| L | Length of pipe, ft | 0.5 | |
| K' | Resistance Coefficient | 0.5274725 | |
| K | Sum of all Resistance Coefficient (K+1 for open end) | 1.5274725 | |
| Y | Net expansion Factor for compressible flow (chart) | 0.606 | |
| ρ | Density of gas, lbm/ft^3 | 0.074887 | |

FIG. 3

| Designation | Description | Size | Cv | Setpoint | Capacity/Range | MAWP [psig] | Typical Operating Pressures [psig] / Temperatures [K] |
|---|---|---|---|---|---|---|---|
| Hand Valves | | | | | | | |
| HV-101  1025 | Inert gas supply ball valve | 1/4" | 8 | --- | --- | 1400 | 50-500 / 300 |
| HV-102  1055 | Vent valve | 1/4" | 8 | --- | --- | 1400 | 50-500 / 300 |
| Pressure Regulators | | | | | | | |
| PRV-201  1050 | Single Stage Regulator | 1/4" | 0.1 | 500 psig (highest) | 0-500 psig, 3500 scfm @ 500psig | 4500 | 50-500 / 300 |
| Safety Devices | | | | | | | |
| PSV-301  1015 | Test system relief valve | 3/4" | --- | 50-500psig | --- | >500 | 50-500 / 300 |
| Pressure Gauges, Transducers, and Switches | | | | | | | |
| PI-401  1020 | System Test Gauge | 1/4" | --- | --- | 0-600psig | 600 | 50-500 / 300 |
| PI-401  1030 | Regulator Low Pressure Side | 1/4" | --- | --- | 0-600psig | 600 | 50-500 / 300 |
| PI-400  1040 | Regulator High Pressure Side | 1/4" | --- | --- | 0-4000psig | 4000 | 500-3000 / 300 |

FIG. 11

| Component | Pressure Rating (psig) | Vendor pressure tested (psig) | System design pressure (psig) | Comment |
|---|---|---|---|---|
| Flex Hose, Braid, 316L S.S. 1/4in FNPT x 1/4in MNPT | 3850 | N/A | 3000 | 304.7.2(a) Extensive service experience and rated by manufacturer. |
| Regulator, 0-500psi, Panel Mount | 4500 | N/A | 3000 | 304.7.2(a) Extensive service experience and rated by manufacturer. |
| CGA 580 Stem and Nut | 3000 | N/A | 3000 | 304.7.2(a) Extensive service experience and rated by manufacturer. |

PORTABLE SELF-CONTAINED PRESSURE TESTING MANIFOLD AND ASSOCIATED METHODS

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to pressure testing technology. More particularly, this invention pertains to devices, systems, and associated methods for performing both pneumatic and hydrostatic pressure testing of pressurized fluid containers.

BACKGROUND OF THE INVENTION

Pressure testing may be defined as a process performed to check for leak-producing defects in the manufacturing, installation, and/or assembly of a system (e.g., comprising one or more vessels and/or piping components) designed for storage and containment of a fluid. Such a process may entail proof testing a system by introducing a working fluid at a test pressure (for example, at 1.5 times the system's nominal working pressure) and checking for leakage and/or pressure drop. A system may be deemed to be successfully pressure tested when that system demonstrates capability to hold the test pressure for a target amount of time.

To accomplish the introduction of fluid to a system for pressure testing, various proof pressure testing manifold designs are commonly available in the art. As a matter of definition, as used herein, a manifold may be defined as a chamber and/or pipe presenting a number of inlets and/or outlets used to gather and/or distribute a fluid (e.g., a liquid and/or a gas). Manifold designs vary widely depending on the testing application desired, and known designs often require significant reconfiguration and/or tailoring to accommodate the unique characteristics of a "one-off" system that is the subject of pressure testing. For example, common off-the-shelf manifolds typically attach directly to the pressure supply of a system (e.g., cylinder) being pressure tested, and are plumbed to test. The more pressure-related measurement readings desired by a user, the more measurement components and related piping/fixtures must be introduced in a tailored manifold before it may attach to the system under test. Furthermore, systems of interest may not always be accessible in a location and/or configuration amenable to attachment to such a tailored manifold for testing.

There are several piping standards that address pressure testing with a liquid under pressure (hydrostatic testing) or an inert gas under pressure (pneumatic testing). Certain of these standards are published by the American Society of Mechanical Engineers (ASME), and those frequently used by mechanical construction professionals include the following:

a) ASME B31.1 Power Piping
  b) ASME B31.3 Process Piping
  c) ASME B31.5 Refrigeration Piping and Heat Transfer Components
  d) ASME B31.9 Building Services Piping Satisfying ASME standards can be challenging. For example, constructing a pressure testing manifold that complies with ASME Process Piping Code B31.3 first involves selecting a fluid service category: non-hazardous (Normal Fluid service), less hazardous (Category D), or extremely hazardous (Category M). Various chapters of the Code are dedicated to the basic piping Code requirements for Normal and Category D fluid service metallic piping (referred to as the base Code). Additional chapters provide rules directed to more specialized applications, such as use of nonmetallic piping and metallic piping lined with nonmetals, piping in Category M Fluid Service, and high-pressure piping. The Code tabulates standards for piping components, and also identifies "listed" piping components (including certain metallic pipe) that are deemed to be manufactured in accordance with standards that have been reviewed and accepted by a code committee for use in ASME B31.3 piping systems. Components that do not comply with those standards are considered "unlisted" components. See, for example, table 100 at FIG. 1 for an excerpt of Allowable Stresses for Material Used in Piping per ASME B31.3 Table A-1, which specifies the lowest allowable stress 130 of 16,700 pounds per square inch (psi) for certain listed components (e.g., pipe 122, fittings 124, braided flex hose 126) fabricated from various grades of stainless steel materials 110. Also see, for example, table 200 at FIG. 2 for an excerpt of Minimal Wall Thickness Required for Pressure Rating per ASME B31.3 Section 304.1.2(a), which specifies the minimum required wall thickness 230 and nominal wall thickness 240 for an employed type of piping 210 at a pressure rating 220 of 3000 pounds per square inch gauge (psig).

Accordingly, a need exists for a solution to at least one of the aforementioned challenges in pressure testing manifold design. For instance, an established need exists for improvements in the state of the art for fabricating and deploying a manifold design that not only is ASME-complaint in terms of quality and safety, but also supports both hydrostatic and pneumatic tests of "one-off" pressurized cylinders and/or piping systems with minimal manifold reconfiguration and/or tailoring. A further need exists for a manifold design that is portable to allow more freedom and flexibility of application in space-limited and/or location-limited testing environments.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a portable self-contained pressure testing assembly that houses a manifold that, by design, requires minimal tailoring and/or reconfiguration to support "one-off" system test scenarios. In certain embodiments, the ASME-compliant pressure test manifold technology described herein may advantageously be used for mobile pressure testing support as applied to a variety of fluid containment systems and/or pressurized vessels. This self-contained, "solution in a box" design may advantageously minimize the need for a user of the present invention to identify, gather, and assemble needed components on a per-application basis.

In a first embodiment of the present invention, a pressure test assembly configured to support both pneumatic and hydrostatic pressure testing may comprise a manifold characterized by a downstream fluid path and an upstream fluid path. The downstream fluid path may comprise a system test gauge, a vent valve, a system test port, a system relief valve port, and various other components and/or piping. The upstream fluid path may comprise a high-pressure gauge and various other components and/or piping. The assembly may further comprise a regulator configured to selectively operate the downstream fluid path, defining a hydrostatic pressure testing path, to receive a liquid; and the upstream fluid path and the downstream fluid path in combination, defining a pneumatic pressure testing path, to receive a gas.

The various manifold components listed above may be pressure rated based on their intended use during pressure testing. The low-pressure gauge may be a dial gauge with a low-pressure range of 0-600 psi, and the associated relief valve port may receive a cartridge-type valve pressure rated in this same low-pressure range. The high-pressure gauge may be a dial gauge with a high-pressure range of 0-4000 psi, and the associated relief valve port may receive a cartridge-type valve pressure rated in this same high-pressure range. The regulator may be characterized by a regulated pressure range of 0-500 psi. The high-pressure rated piping components and the low-pressure rated piping components all may be ASME Code B31.3 compliant. For example, and without limitation, the system test port may comprise a connection fitting of a fitting type appropriate for use with inert gas (e.g., CGA 580, CGA-590, and CGA-326).

In another embodiment of the present invention, the pressure test assembly may further comprise a flexible hose configured to connect in fluid communication with either of the low-pressure fluid path and the high-pressure fluid path of the manifold. The pressure test assembly may further comprise a case configured to carry the manifold. The case may feature some number of parking receptacles configured to mechanically secure one or more ends of the flexible hose during assembly transport. The case may further comprise at least one carrying handle configured to mechanically secure a section of the flexible hose.

In a method aspect of the present invention, a first method of operating the pressure testing assembly described above to perform a pneumatic pressure test on a test subject may comprise the steps of A) mechanically stabilizing the case of the pressure testing assembly upon a horizontal surface, B) configuring the low-pressure fluid path for operation by capping off the low-pressure gauge; C) using the regulator to select the low-pressure fluid path for operation; D) using the flexible hose to connect in fluid communication the system test valve to the test subject; E) receiving a gas into the low-pressure fluid path; and F) iteratively increasing a cumulative pressure in the low-pressure fluid path by a step pressure. The user may, upon leak detection at the cumulative pressure, G1) reduce the cumulative pressure by a percentage of the cumulative pressure or, alternatively, upon the cumulative pressure equaling a test pressure, G2) hold the test pressure for a time step; before H) depressurizing the low-pressure fluid path. In a typical pneumatic test scenario, the target pressure may be 550 psig, the step pressure 100 psig, and the percentage of the cumulative pressure 50%.

In another method aspect of the present invention, a second method of operating the pressure testing assembly described above to perform a hydrostatic pressure test on a test subject may comprise the steps of J) mechanically stabilizing the case of the pressure testing assembly upon a horizontal surface, K) configuring the high-pressure fluid path for operation by capping off each of the relief valve port, the system test port, and the vent valve to select the high-pressure fluid path for operation; M) using the flexible hose to connect in fluid communication the system test valve to the test subject; N) receiving a liquid into the high-pressure fluid path; P) iteratively increasing a cumulative pressure in the high-pressure fluid path by a step pressure. The user may, upon leak detection at the cumulative pressure, Q1) reduce the cumulative pressure by a percentage of the cumulative pressure; or, alternatively, upon the cumulative pressure equaling a test pressure, Q2) hold the test pressure for a time step; before R) depressurizing the high-pressure fluid path. In a typical hydrostatic test scenario, the target pressure may be 4500 psig, the step pressure 800 psig, and the percentage of the cumulative pressure 50%.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1 is a table illustrating allowable stresses for exemplary materials used in piping as specified in the ASME B31.3 code Table A-1 according to the prior art;

FIG. 2 is a table illustrating wall thickness required for pressure rating as specified in the ASME B31.3 code Section 304.1.2(a) according to the prior art;

FIG. 3 is a table illustrating mass flow calculation for gas discharge as specified in the CRANE Technical Paper N.410 according to the prior art;

FIG. 11 is a table illustrating exemplary component specifications for the piping and instrumentation of FIG. 10;

FIG. 13 is a table illustrating exemplary pressure ratings for select unlisted components shown in the portable self-contained pressure testing assembly illustrated in FIGS. 4-6 and in the pressure test manifold illustrated in FIGS. 7-9.

Like reference numerals refer to like parts throughout the several views of the drawings.

DETAILED DESCRIPTION OF THE INVENTION

Figure 4:
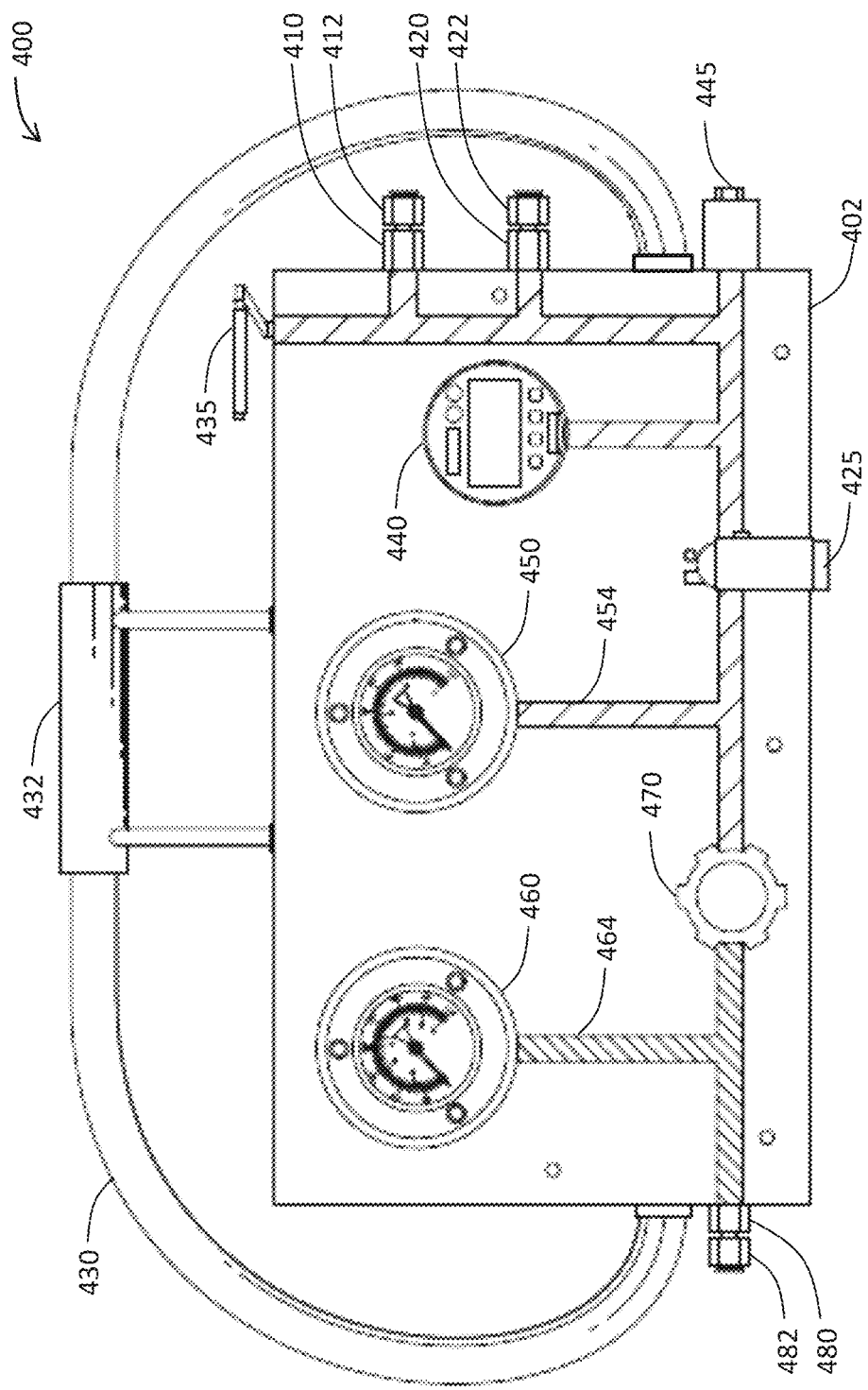
FIG. 4 is a front view of a portable self-contained pressure testing assembly according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 4-14, a portable self-contained pressure testing assembly and associated methods according to certain embodiments of the present invention are now described in detail. Throughout this disclosure, the present invention may be referred to as a pressure testing assembly, a pressure testing manifold, a pressure test assembly, a pressure test device, a pressure testing case, a pressure tester, a test manifold, a manifold, an assembly, a device, a system, a product, and/or a method for mobile and/or one-off pressure testing. Those skilled in the art will appreciate that this terminology is only illustrative and does not affect the scope of the invention. For instance, the present invention may just as easily relate to mountable fluid pressure testing technology.

Generally speaking, the ASME-compliant pressure testing assembly described herein introduces portable, self-contained, and application-flexible support as improvements to traditional pressure test manifold technology. The present invention, as described hereinbelow, may be used for pressure testing a variety of fluid containment systems and/or pressurized vessels while minimizing the need to identify, gather, and assemble needed components on a per-application basis.

Figure 5:
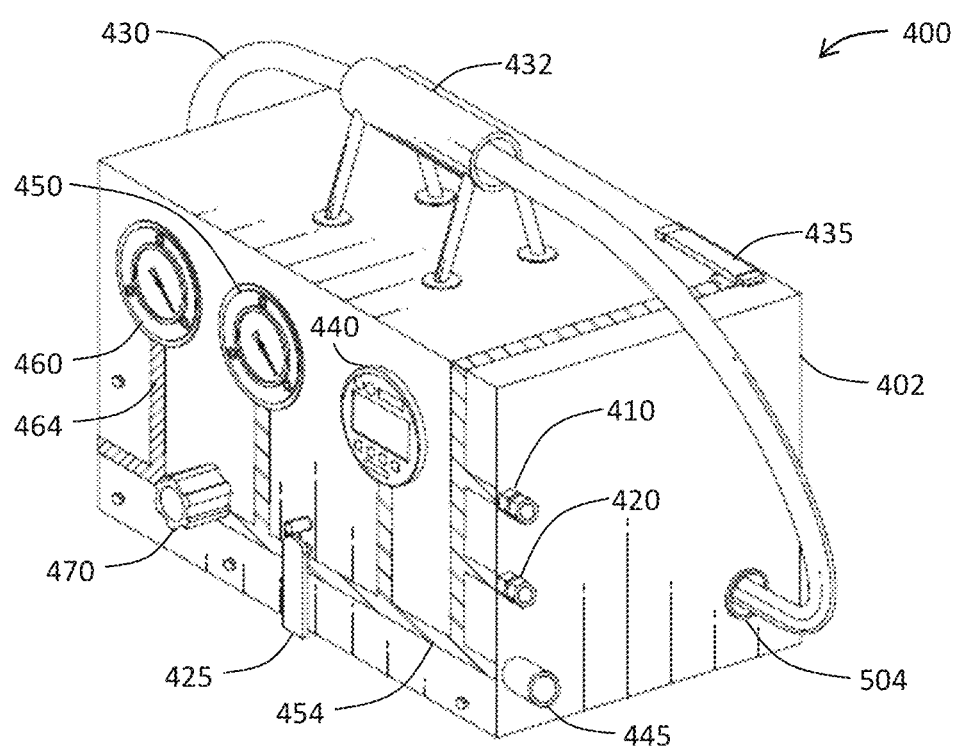
FIG. 5 is a perspective top front view of the portable self-contained pressure testing assembly illustrated in FIG. 4.
Figure 6:
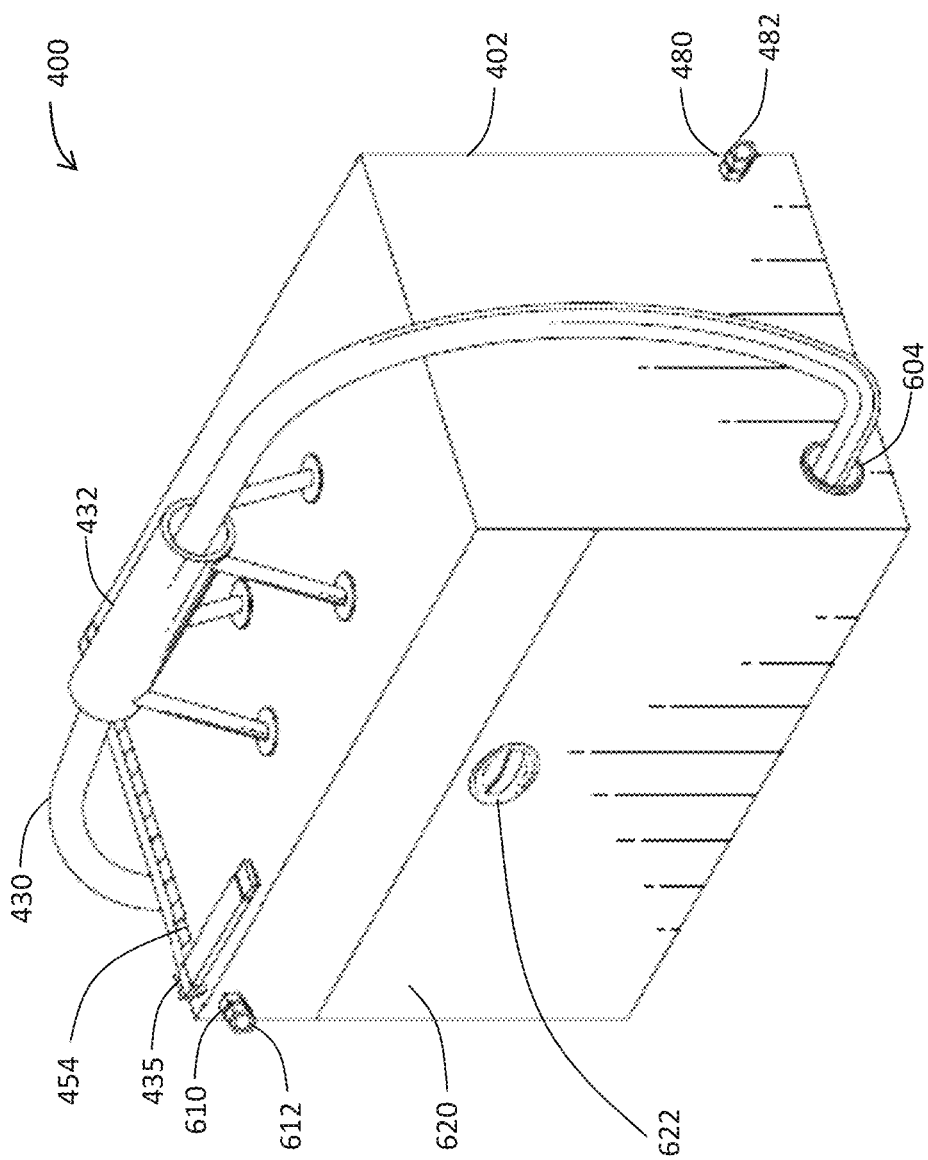
FIG. 6 is a perspective top rear view of the portable self-contained pressure testing assembly illustrated in FIG. 4.

Referring to FIGS. 4, 5, and 6, in more detail, a portable self-contained pressure testing assembly 400, according to an embodiment of the present invention, may include a case 402 configured to enclose (e.g., behind an access door 620 securable by a latch 622) and mechanically carry a pressure test manifold (described in detail hereinbelow and illustrated in FIGS. 7, 8, and 9) that may be connected in fluid communication with, for example, and without limitation, a fluid-containing cylinder to be tested (not shown) via a flexible hose 430. Some number of connection fittings 410, 420, 480, 610; connection caps 412, 422, 482, 612; ball (vent) valves 425, 435; ports for relief valves 445; and/or regulators 470 accessible from an exterior of the case 402 and positioned along the pressure test manifold may define at least two fluid paths along which various pressure measurement components may be advantageously positioned for visual monitoring by a user of the assembly 400.

For example, and without limitation, the case 402 may be adorned with indicator markings 454, 464 that communicate route(s) and/or type(s) of fluid paths available to users of the assembly 400. As shown in FIGS. 4, 5, and 6, the pressure measurement components may include a low-pressure dial gauge 450 positioned along a low-pressure fluid path 454 (also referred to herein as "downstream"). In certain embodiments, the low-pressure dial gauge 450 may be rated at 0-600 psi. Available pressure measurement components also may include a high-pressure dial gauge 460 positioned along a high-pressure fluid path 464 (also referred to herein as "upstream"). In certain embodiments, the high-pressure dial gauge 460 may be rated at 0-4000 psi. Transition from the low-pressure fluid path 454 and the high-pressure fluid path 464 may be controlled by a regulator rated at 0-500 psi and/or a vent valve 425. For visual reference, the low-pressure fluid path indicator markings 454 and the high-pressure fluid path indicator markings 464 may be distinguished by color, pattern, and/or form. Available pressure measurement components also may include a system test gauge 440 operable to deliver more sensitive measurements than the other course gauges 450, 460, and for both pneumatic and hydrostatic applications. For example, and without limitation, the system test gauge 440 may be digital and rated at 0-600 psi.

For example, and without limitation, the case 402 may be adorned with indicator markings 454, 464 that communicate route(s) and/or type(s) of fluid paths available to users of the assembly 400. As shown in FIGS. 4, 5, and 6, the pressure measurement components may include a low-pressure dial gauge 450 positioned along downstream fluid path 454. In certain embodiments, the low-pressure dial gauge 450 may be rated at 0-600 psi. Available pressure measurement components also may include a high-pressure dial gauge 460 positioned along upstream fluid path 464. In certain embodiments, the high-pressure dial gauge 460 may be rated at 0-4000 psi. Transition from the downstream fluid path 454 and the upstream fluid path 464 may be controlled by a regulator rated at 0-500 psi and/or a ball (vent) valve 425. For visual reference, the downstream fluid path indicator markings 454 and the upstream fluid path indicator markings 464 may be distinguished by color, pattern, and/or form. Available pressure measurement components also may include a system test gauge 440 operable to deliver more sensitive measurements than the other course gauges 450, 460, and for both pneumatic and hydrostatic applications. For example, and without limitation, the system test gauge 440 may be digital and rated at 0-600 psi.

Continuing to refer to FIGS. 4, 5, and 6, the flexible hose 430 may comprise, for example, and without limitation, a wire braid hose made of stainless steel (e.g., 316L grade) and having two ends that each terminate in connection fittings (not shown) appropriate for pressure test use. A number of commonly used CGA-fittings that are appropriate for non-combustible applications may be employed in the present manifold design of the pressure testing assembly 400. For example, and without limitation, when inert gas is applied for pneumatic tests using the manifold design of the pressure testing assembly 400, CGA-580 fittings may be employed for attachment of a compressed gas cylinder containing a nonflammable, non-oxidizing gas such as nitrogen, argon, or helium; CGA-590 may be used for compressed air; and CGA-326 may be used for nitrous oxide. In keeping with ASME Code B31.3 guidance from FIG. 1, the lowest allowable stress 130 of 16,700 psi (i.e., that of 304L stainless steel material 110) may be satisfied by braided flex hose 430 and connection fittings 410, 420, 480, 610 employed in the present assembly 400 design.

The hose 430 may be of sufficient length (e.g., approximately six (6) feet) to engage a pressurized system or vessel under test from a safe and functional distance, but not so long as to introduce test-compromising friction loss. The length of hose 430 may also be selected such that, when not in use or during assembly 400 porting, the hose 430 may be stowed by tucking first and second ends of the hose 430 into respective parking receptacles 504, 604 that may be affixed into positions on the case 402 in such a way as to prevent the hose 430 from being kinked and/or either end of the hose 430 from being stowed under undue strain. In certain embodiments of the present invention, the hose 430 may be further secured by engagement with a handle 432 (otherwise used to carry and/or steady the assembly 400) while the hose 430 is stowed using the parking receptacles 504, 604).

Figure 7:
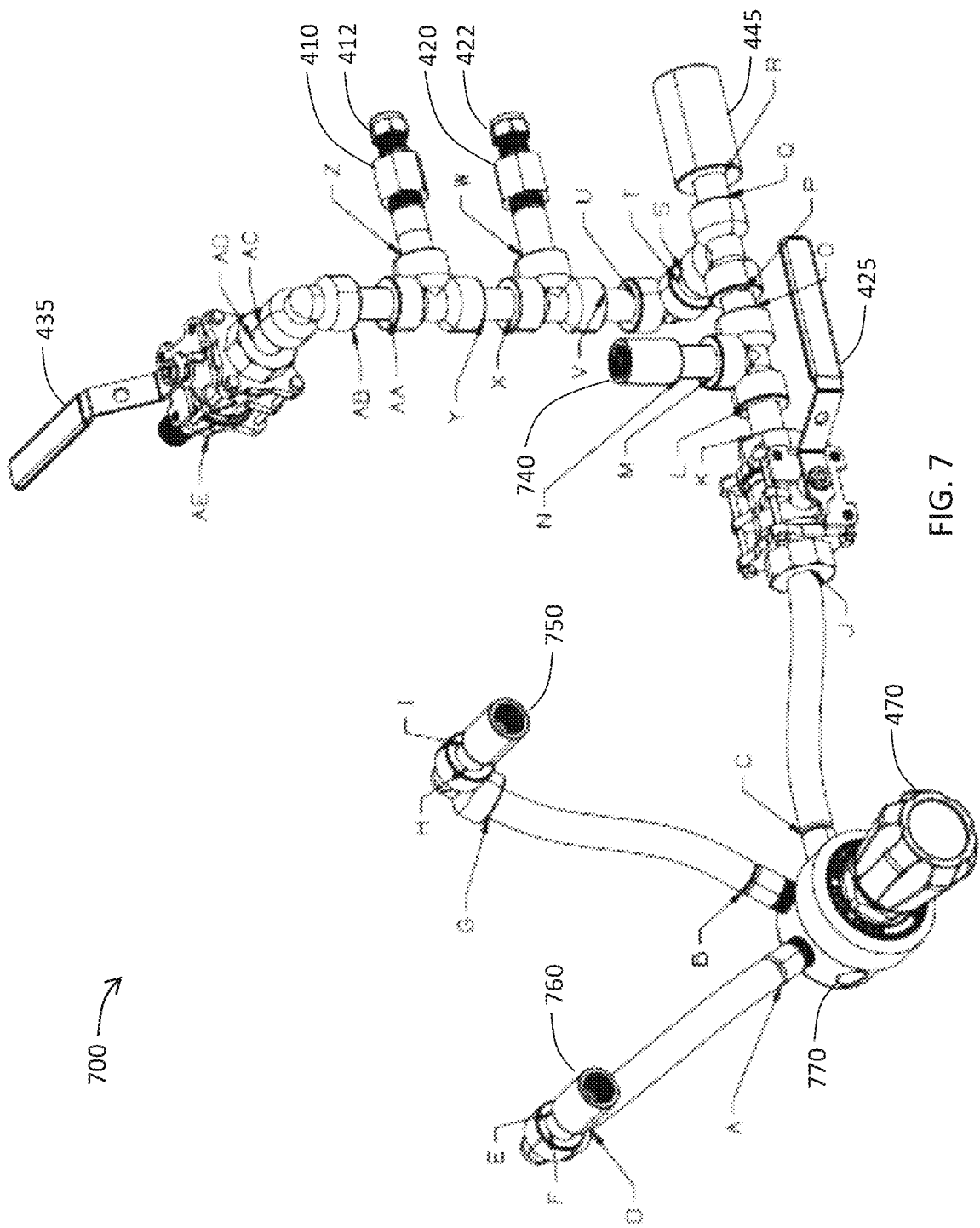
FIG. 7 is a perspective top front view of an exemplary pressure test manifold of the portable self-contained pressure testing assembly illustrated in FIG. 4.
Figure 8:
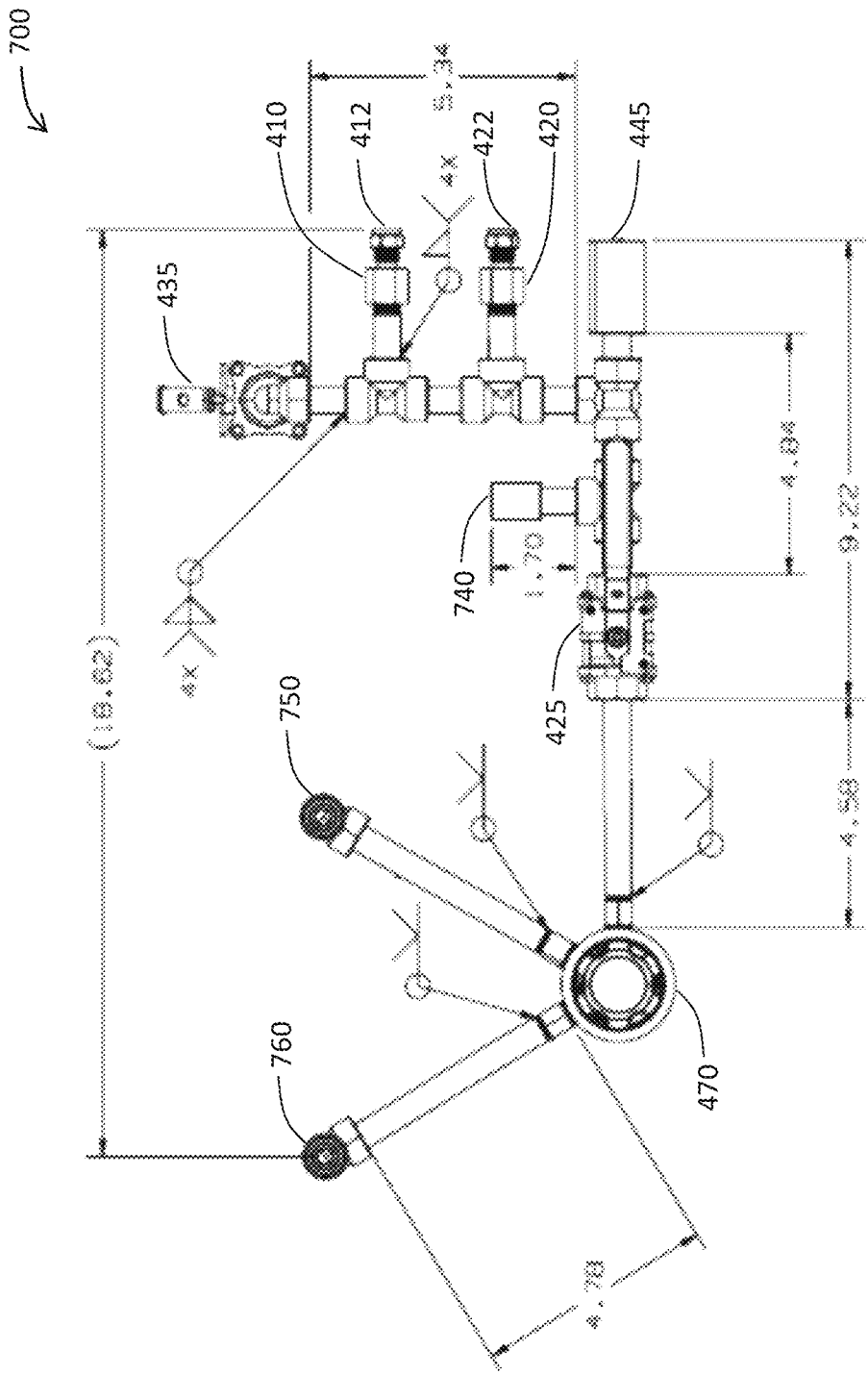
FIG. 8 is a front view of the exemplary pressure test manifold illustrated in FIG. 7.
Figure 9:
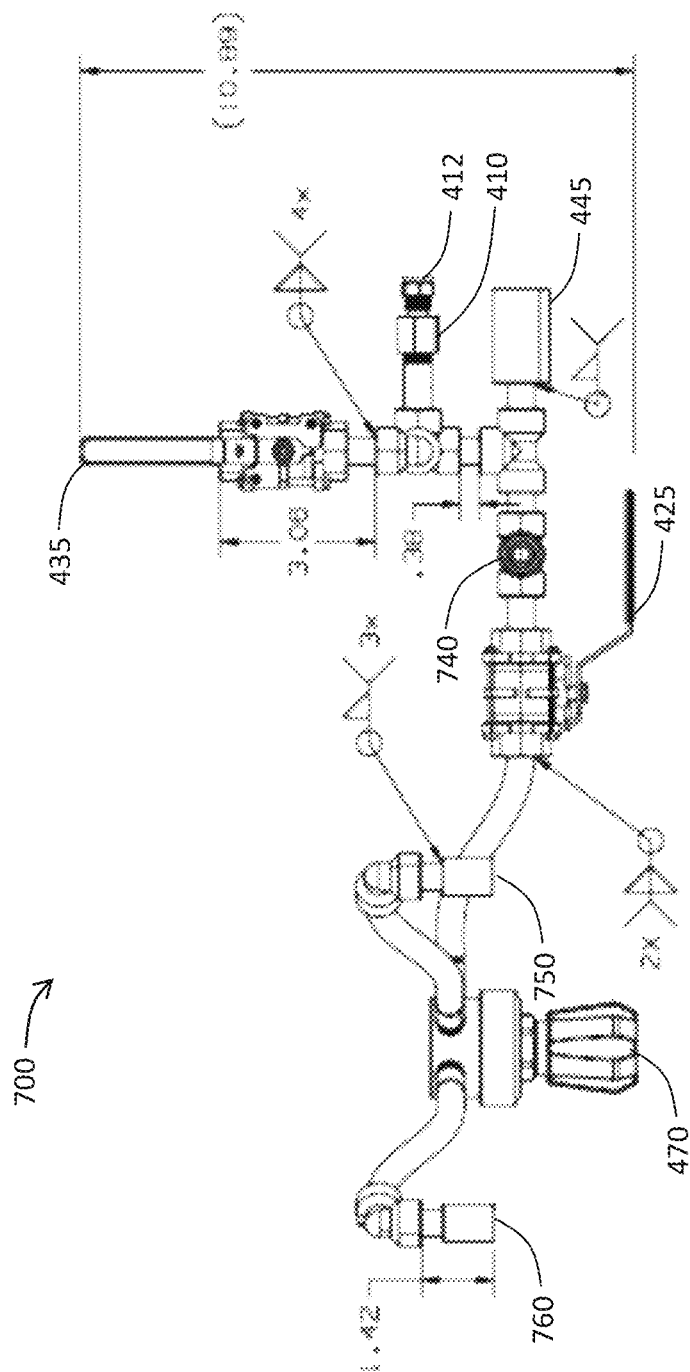
FIG. 9 is a top view of the exemplary pressure test manifold illustrated in FIG. 7.

Referring now to FIGS. 7, 8, and 9, in more detail, a pressure test manifold 700, according to an embodiment of the present invention, may include piping connected in fluid communication with some number of connection fittings 410, 420, 480, 610; connection caps 412, 422, 482, 612; ball (vent) valves 425, 435; ports for relief valves 445; and/or regulators 470 to define at least two fluid paths along which various pressure measurement components may be advantageously positioned. As illustrated in FIG. 7, a first system test port may be formed by connection fitting 410 and associated cap 412; and a second system test port may be formed by connection fitting 420 and associated cap 422. The port engaging a cartridge valve 445 may be operable as a relief valve. A person of skill in the art will immediately recognize that switching manifold 700 operation from low-pressure to high-pressure may be as simple as changing the relief valve type to a higher pressure rated component. Also illustrated in FIGS. 8 and 9 are rough indicators of the size of the manifold 700 and certain included components (which, in turn, may drive the general dimensions of the case 402 from FIGS. 4, 5, and 6).

Piping comprising the pressure test manifold 700 may be classified as non-cryogenic piping, and may be designed to adhere to the requirements of the ASME Process Piping Code B31.3 for Normal Fluid service given design of the manifold 700 for target working pressures above 150 psig. Manifold 700 piping may be fabricated from 300 series stainless steel welded pipe and fittings. For example, and without limitation, in keeping with guidance from FIG. 1, the lowest allowable stress 130 of 16,700 psi (i.e., that of 304L stainless steel material 110) may be satisfied by all components, pipes, and/or fittings employed in the present manifold 700 design.

During typical operation of the portable self-contained pressure testing assembly 400, certain embodiments of the manifold 700 piping may experience a room temperature environment in a range of approximately 68° F. (293K) to 77° F. (298K). In alternative embodiments, the manifold 700 piping may be employed in atmospheric ambient temperatures in a range of approximately −36° F. (235K) to 117° F. (320K). For 304/304L and 316/316L stainless steel pipe, fittings, and hose, the allowable stresses described above remain the same throughout the atmospheric ambient temperatures range.

A full complement of components, pipes, and/or fittings employed in the present manifold 700 design may include the following:

a) Pipe, ¼" OD SHC40, 304SS (quantity 3, at welds A-D, B-G, and C-J of FIG. 7);

b) Regulator, single stage, BS EN ISO 2503 (quantity 1, at 470 of FIG. 7; Note: The hose 430 may be stowed by tucking a first end of the hose 430 into the parking receptacle 504, as described above, while a second end of the hose 430 may remain directly connected (not shown) to the regulator 470 at a threaded port functioning as a source gas inlet 770 (that is, fixedly connected both during operation and during assembly 400 stowing/porting);

c) Nipple pipe, SCH40, one-sided thread, ¼"×1.125" 304SS (quantity 6, at welds A, B, and C all threadedly connected to regulator 470 of FIG. 7; at welds W and Z and threadedly connected to connectors 410, 420, respectively of FIG. 7; and at weld AE of FIG. 7);

d) Coupling, ¼" MNPT×socket weld (quantity 3, at welds E, I, and N of 760, 750, and 740, respectively, of FIG. 7);

e) Tee, pipe, ¼" socket weld (quantity 4, at welds L-M-O, P-Q-S, V-W-X, and Y-Z-AA of FIG. 7);

f) Elbow, 90 degrees, ¼" socket weld (quantity 4, at welds D-F, G-H, T-U, and AB-AC of FIG. 7);

g) Ball valve, ¼" OF SCH40, 304SS (quantity 2, at welds J-K and AD-AE of 425 and 435, respectively, of FIG. 7);

h) Pipe, ¼" OF SCH40, 304SS (quantity 11, at welds E-F, H-I, K-L, M-N, O-P, Q-R, S-T, U-V, X-Y, AA-AB, and AC-AD of FIG. 7);

i) Cartridge valve coupling (ZCO), ¼" socket weld×½" MNPT, socket weld (quantity 1, at 445 of FIG. 7);

j) Female connector, ¼" ZCO×¼" FNPT, 316SS (quantity 2, at 410, 420 of FIG. 7); and k) Cap, ¼" ZCO HY-LOK (quantity 2, at 412 and 422 of FIG. 7).

As described above, all piping comprising the manifold 700 may be protected by a port configured to receive a relief valve 445. Capacity of the relief valve 445 at the port may be sized accordingly to the system to which the manifold may be connected and based on the specific test pressure required by the fabrication and design codes (i.e. ASME Sect. B31.3, ASME Section VIII) for the test system. In the embodiment illustrated in FIGS. 4-9, the highest possible relief valve crack pressure may be set up to 500 psi.

Figure 10:
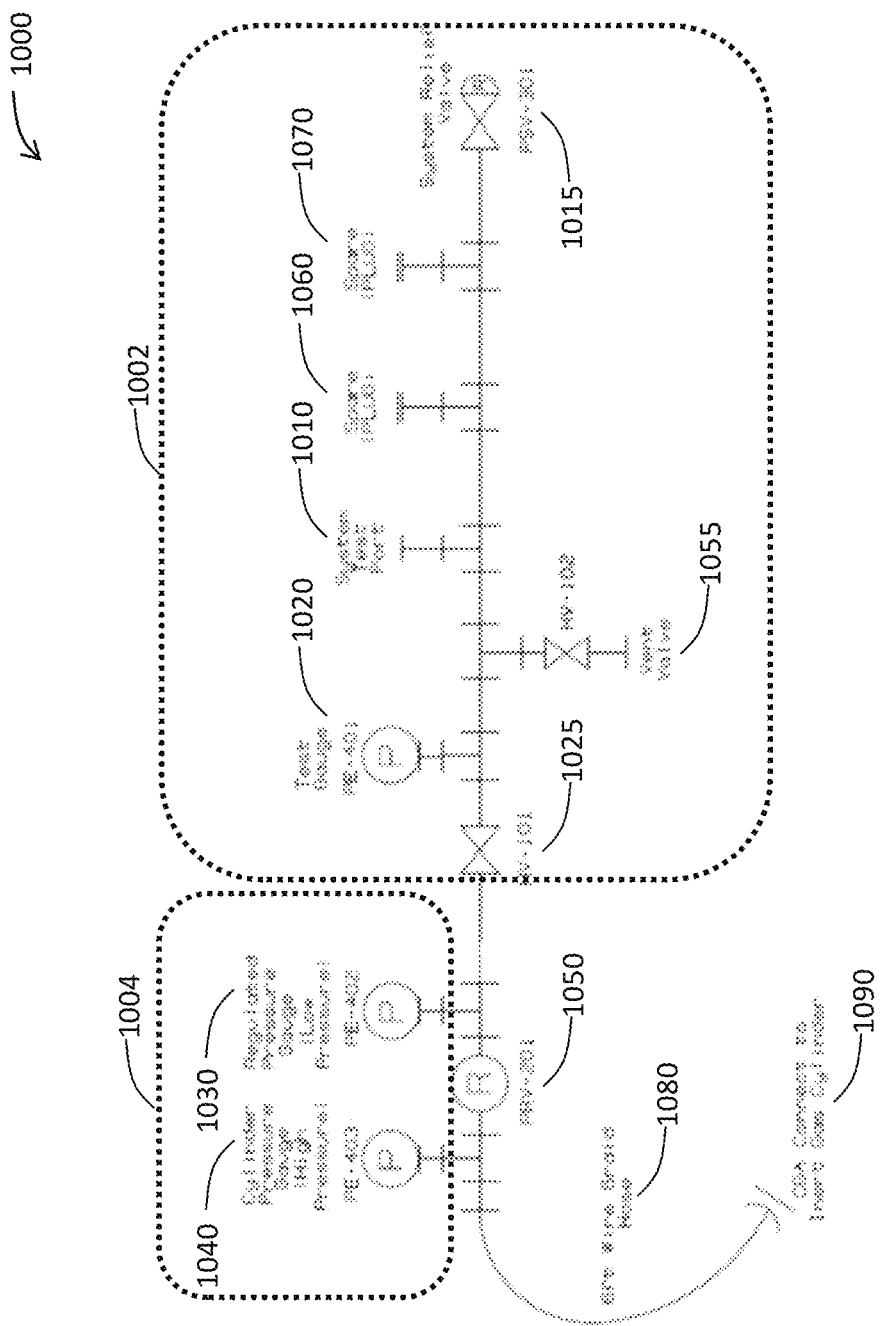
FIG. 10 is a schematic diagram illustrating exemplary piping and instrumentation for a portable self-contained pressure testing assembly according to an embodiment of the present invention.

At FIG. 10, schematic diagram 1000 illustrating exemplary piping and instrumentation for a portable self-contained pressure testing assembly according to an embodiment of the present invention. Also shown are delineations of the downstream 1002 and upstream 1004 sections of the exemplary assembly 1000. Table 1100 of FIG. 11 (which is cross-referenced with FIG. 10 in the Designation 1110 column) provides exemplary component specifications including Description 1120, Size 1130, Check Valve (Cv)

1140, Setpoint 1150, Capacity 1160, Maximum Allowable Working Pressure (MAWP) 1170, and Typical Operating Pressures/Temperatures 1180.

Figure 12:
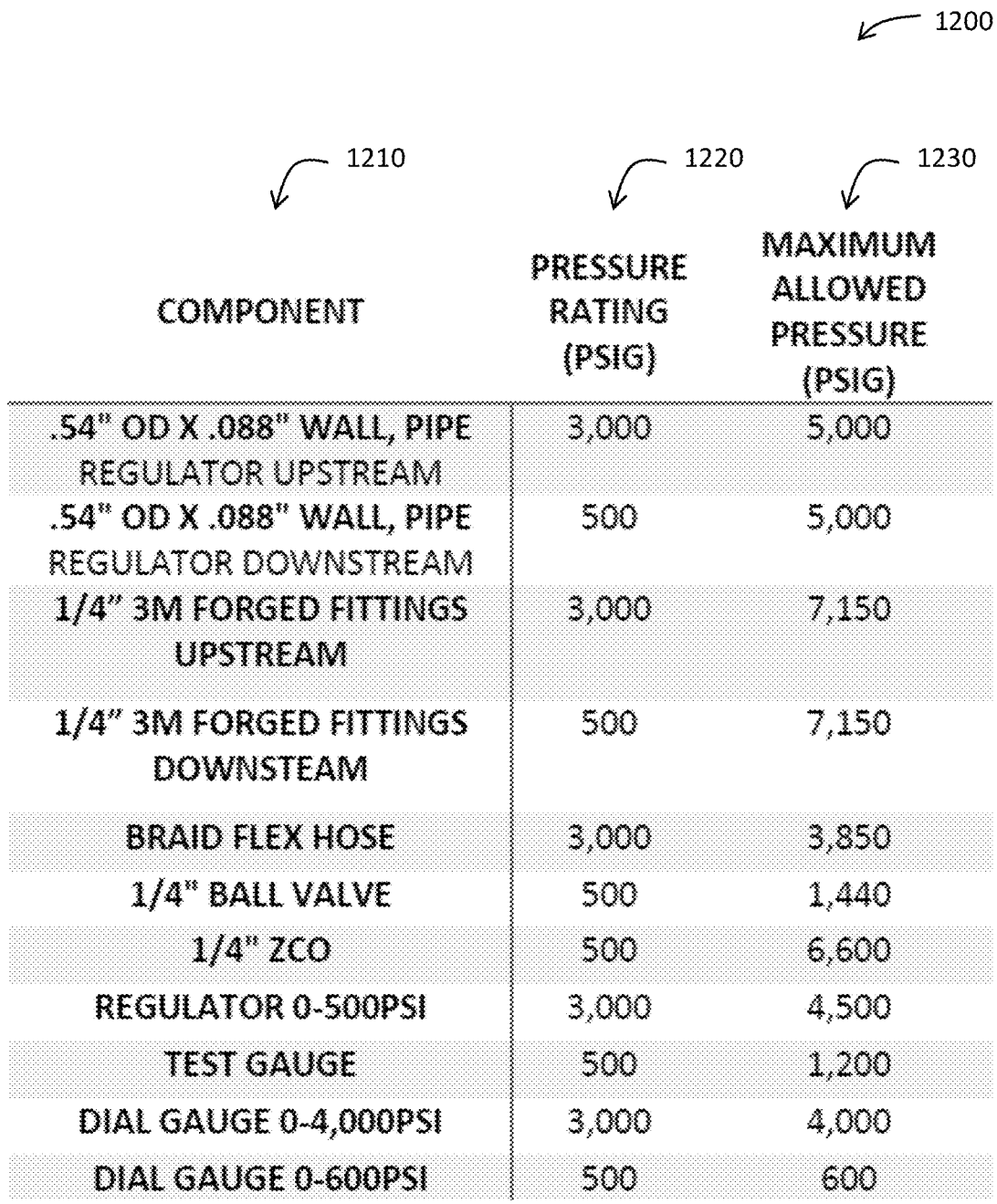
FIG. 12 is a table illustrating exemplary pressure ratings for select listed components shown in the portable self-contained pressure testing assembly illustrated in FIGS. 4-6 and in the pressure test manifold illustrated in FIGS. 7-9.

For Original Equipment Manufacturer (OEM) rated components mentioned above, and as shown in the summary table 1200 at FIG. 12, the pressure ratings 1220 stated by the manufacturer of each listed component 1210 may be lower than the maximum allowable working pressures 1230 required in ASME B31.3 Table 326.1. For unlisted components mentioned above, and as shown in the summary table 1300 at FIG. 13, the pressure ratings 1320 stated by the manufacturer of each listed component 1310 may be lower than the manifold 700 design pressures 1330. Although such unlisted components may not have been reviewed and accepted by a code committee for inclusion in ASME B31.3 Table 326.1, such components selected for inclusion in the manifold 700 of the present invention may satisfy ASME B31.3 para. 204.7.2(a) criterion 1340 for "[e]xtensive service experience and rated by manufacturer."

For welded connections in manifold 700, butt weld joints may be full penetration weld for which the end preparation may conform to ASME B31.3 para.328.4.2. Socket welded joints in manifold 700 may be welded per ASME B31.3 para.328.5.2 for which the socket dimensions may conform to ASME B16.11. Threaded connections in manifold 700 may conform to ASME B31.3 para.314.

For the piping mentioned above, the minimum wall thickness may be greater than that required in ASME B31.3 as summarized 200 in FIG. 2 In certain embodiments of the present design, minimum thickness of manifold 700 piping for internal pressure may be evaluated using procedures in ASME B31.3 Section 304.1.2(a). For example, and without limitation, in one embodiment of the present invention the minimum tube thickness t for seamless or longitudinally welded piping for t<D/6 may be given by the following formula:

$$t = \frac{PD}{2(SEW + PY)}$$

where internal design pressure P=3,000 psi for upstream side (or P=500 psi for downstream side), allowable stress S=16,700 psi (see also FIG. 1), quality factor E=0.8 (worst case; ASME B31.3 Table A-1A or A-1B), weld joint strength reduction factor W=1, and coefficient Y=0.4 (ASME B31.3 Table 304.1.1).

Referring again to FIG. 4, the case 402, considered in combination with the other components of the assembly 400, may be characterized by a size and/or weight that may be functionally significant not only in terms of portability (e.g., light enough for assembly 400 to be moved by a human; small enough footprint to allow use of assembly 400 in tight quarters) but also in terms of operability (e.g., heavy enough for assembly 400 to remain stable when performing pressure test steps). A person of skill in the art will immediately recognize that thoughtful selection of fabrication materials for the case 402 (e.g., stainless steel) may impact these important size and weight factors.

For example, and without limitation, vent valve thrust is one driver of target construction weight for a portable self-contained pressure testing assembly 400. Reaction forces in an open discharge system may be calculated using the following formula:

$$F = \frac{W}{366}\sqrt{\frac{k*T}{(k+1)*M}} + AP = 40.5 \text{ lbs}$$

where:
F=reaction force at the point of discharge to the atmosphere [in pound-force (lbf)];
W=4,361.14 [in pound-mass per hour (lbm/hr)]=mass flow rate of gas (see, for example, FIG. 3 for mass flow calculation 300 for gas discharge);
k=1.4=ratio of specific heats at the outlet conditions;
T=530 [° R]=outlet temperature;
M=28.97 [g/mol]=molecular weight of gas;
A=0.104 [in$^2$]=area of outlet at the point of discharge; and
P=14.7 [psia]=static pressure within the outlet at the point of discharge.

As computed above, atmospheric pressure at an outlet of the piping system (e.g., relief valve 445 at port) may be assumed to be 14.7 psia. The system connected to the manifold 700 may be assumed to be charged with gas. Assuming the gas to be air in a pressure testing scenario, a reaction force may be calculated to be 41-lbf, which may be readily supported by mounting the case 402 of the assembly 400 to a cart or other secure structures (e.g., desk or other flat surface) near test piping when engaged for testing purposes.

Figure 14:
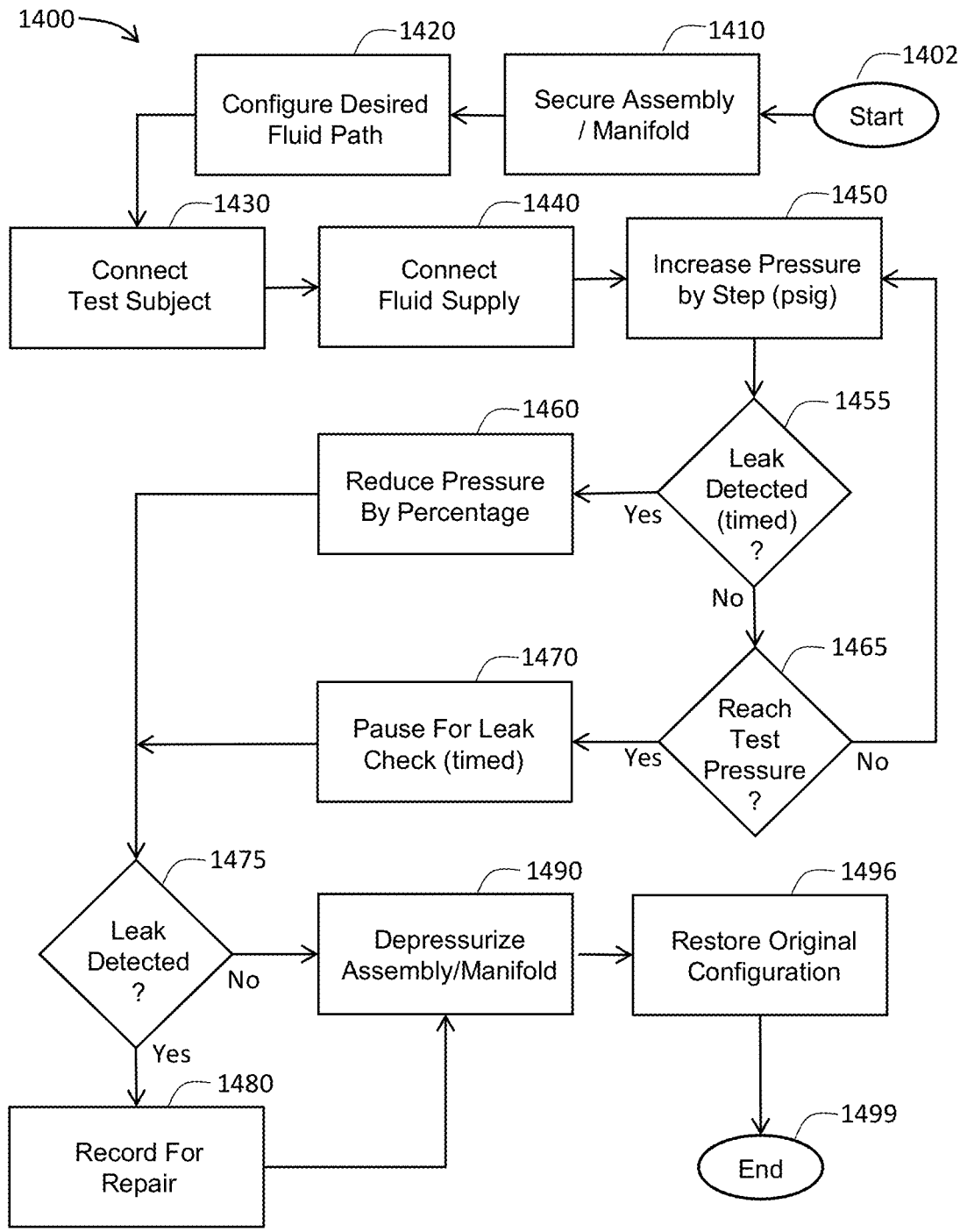
FIG. 14 is a method of operating a portable self-contained pressure testing assembly according to an embodiment of the present invention.

Referring now to FIG. 14 and additionally to FIGS. 4-10, a method aspect of using a portable self-contained pressure testing assembly 400 according to an embodiment of the present invention is now described in detail.

In one aspect of the use method 1400, the present invention may be advantageously applied to perform a pneumatic test at a test pressure of 550 psig for a maximum allowable working pressure of 500 psig. Such a test may employ the low-pressure fluid path of the pressure test manifold 700 as described above.

From the start at Block 1402, a user may mechanically secure the assembly 400 (e.g., to a tabletop) to prevent motion and/or whipping (Block 1410) and may configure the low-pressure fluid path for test operation (Block 1420). For example, and without limitation, the user may cap off the port for the system (pressure) relief valve 1015 (e.g., system relief valve 445), the test gauge 1020 (e.g., system test gauge 440), the system test port 1010 (e.g., system test port 410), the vent valve 1055 (e.g., vent valve 435), and two spare ports 1060, 1070 (e.g., spare port 420). The user may then close ball valve 1025 (e.g., ball valve 425) between the test gauge 1020 (e.g., test gauge 440) and the low-pressure gauge 1040 (e.g., low-pressure gauge 450) and open the vent valve 1055 (e.g., vent valve 435). At Block 1430, the user may employ the flexible hose 1080 (e.g., flexible hose 430) to connect the manifold 700 to the test subject 1090 before connecting the manifold 700 to the inert gas (e.g., nitrogen) supply (Block 1440).

During the test procedure 1400, pressure may be increased in steps (Block 1450), with the user waiting at each step to verify that the pressure remains constant. For example, and without limitation, the pressure in the piping may initially be increased to 25 psig and held for five (5) minutes. If no leak is detected at Block 1455, the user may iteratively increase the pressure by increments of no more than 100 psig (holding at each iteration for five (5) minutes while checking for leaks). If at any time a leak is suspected at Block 1455, the user may reduce the pressure to half of the value for the current step (Block 1460) and check for leaks with the soap and bubble method (Block 1475). If a leak is found, this repair requirement may be noted (Block 1480) and the manifold 700 may be depressurized (Block 1490) to stop testing.

After incremental pressure increases reach the desired test pressure (Block 1465) without exposure of a leak (Block 1455), the user may hold that pressure for ten (10) minutes (Block 1470) while watching for loss of pressure. If no pressure loss is evident, the user may reduce pressure to design pressure and check all seams and fittings with soap bubble or alternate leak detection method (Block 1475). If a leak is found, this repair requirement may be noted (Block 1480). The pressure test having concluded (with or without leakage), the manifold 700 may be depressurized at Block 1490 and the assembly 400 disengaged from the target system to restore that system to its original configuration (Block 1496). Method 1400 may then end at Block 1499.

In another aspect of the use method 1400, the present invention may be advantageously applied to perform a hydrostatic test at a test pressure of 4500 psig for a maximum allowable working pressure of 3000 psig. Such a test may employ the high-pressure fluid path of the pressure test manifold 700 as described above.

From the start at Block 1402, a user may mechanically secure the assembly 400 (e.g., to a tabletop) to prevent motion and/or whipping (Block 1410) and may configure the high-pressure fluid path for test operation (Block 1420) by capping off gauge ports. At Block 1430, the user may employ the flexible hose 1080 (e.g., flexible hose 430) to connect the manifold 700 to the test subject 1090 before connecting the manifold 700 to the liquid (e.g., water) supply (Block 1440).

During the test procedure 1400, pressure may be increased in steps (Block 1450), with the user waiting at each step to verify that the pressure remains constant. For example, and without limitation, the pressure in the piping may initially be increased to 50 psig and held for five (5) minutes. If no leak is detected at Block 1455, the user may iteratively increase the pressure by increments of no more than 800 psig (holding at each iteration for five (5) minutes while checking for leaks). If at any time a leak is suspected at Block 1455, the user may reduce the pressure to half of the value for the current step (Block 1460) and check for water leaks (Block 1475). If a leak is found, this repair requirement may be noted (Block 1480) and the manifold 700 may be depressurized (Block 1490) to stop testing.

After incremental pressure increases reach the desired test pressure (Block 1465) without exposure of a leak (Block 1455), the user may hold that pressure for ten (10) minutes (Block 1470) while watching for loss of pressure. If no pressure loss is evident, the user may reduce pressure to design pressure and check all seams and fittings for water leakage (Block 1475). If a leak is found, this repair requirement may be noted (Block 1480). The pressure test having been concluded (with or without leakage), the manifold 700 may be depressurized (Block 1490) and the assembly 400 disengaged from the target system to restore that system to its original configuration (Block 1496). Method 1400 may then end at Block 1499.

Some of the illustrative aspects of the present invention may be advantageously in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. A pressure test assembly comprising:
 a manifold comprising:
  a pneumatic pressure testing path comprising a plurality of piping components configured to join, in gaseous fluid communication,
   a regulator having a high-pressure gauge, a low-pressure gauge, and a source gas inlet configured to receive an input gas,
   a ball valve,
   system test gauge,
   a vent valve,
   a system test port, and
   a system relief valve;
  a hydrostatic pressure testing path comprising a subset of the plurality of piping components configured to join, in liquid fluid communication,
   a spare port,
   the system test gauge,
   the vent valve,
   the system test port,
   the system relief valve, and
   the ball valve configured in a closed state; and
 a case configured to carry the manifold.

2. The pressure test assembly according to claim 1, wherein the low-pressure gauge is characterized by a low-pressure range of 0-600 psi and the high-pressure gauge is characterized by a high-pressure range of 0-4000 psi.

3. The pressure test assembly according to claim 1, wherein the system relief valve in the pneumatic pressure testing path is pressure rated between 50 and 500 psig.

4. The pressure test assembly according to claim 1 further comprising a flexible hose configured to join in gaseous fluid communication with the source gas inlet of the regulator.

5. The pressure test assembly according to claim 4, wherein the case further comprises a parking receptacle configured to mechanically secure an end of the flexible hose.

6. The pressure test assembly according to claim 5, wherein the case further comprises at least one carrying handle configured to mechanically secure a substantially medial section of the flexible hose.

7. The pressure test assembly according to claim 1, wherein the system relief valve in the hydrostatic pressure testing path is of a cartridge-type.

8. The pressure test assembly according to claim 1, wherein the regulator is characterized by a regulated pressure range of 0-500 psi.

9. The pressure test assembly according to claim 1, wherein the system test port comprises a connection fitting of a fitting type selected from the group consisting of CGA-580, CGA-590, and CGA-326.

10. The pressure test assembly according to claim 1, wherein the plurality of piping components are ASME Code B31.3 compliant.

11. A method of operating a pressure testing assembly to perform a hydrostatic pressure test on a test subject, the pressure testing assembly comprising:
a manifold comprising:
a pneumatic pressure testing path comprising a plurality of piping components configured to join, in gaseous fluid communication,
a regulator having a high-pressure gauge, a low-pressure gauge, and a source gas inlet,
a ball valve,
system test gauge,
a vent valve,
a system test port, and
a system relief valve;
a hydrostatic pressure testing path comprising a subset of the plurality of piping components configured to join, in liquid fluid communication,
a spare port,
the system test gauge,
the vent valve,
the system test port,
the system relief valve, and
the ball valve; and
a case configured to mechanically carry the manifold;
the method comprising the steps of:
receiving, using a cartridge valve coupling, the system relief valve pressure rate between 50 and 500 psig;
closing the ball valve;
connecting in liquid fluid communication the system test port to the test subject;
receiving, using the spare port, an input liquid;
measuring, using the system test gauge, a cumulative pressure of the input fluid until
upon leak detection at the cumulative pressure, reducing the cumulative pressure by a percentage of the cumulative pressure, and
upon the cumulative pressure equaling a test pressure, holding the test pressure for a time step.

12. The method according to claim 11 further comprising mechanically stabilizing the case of the pressure testing assembly upon a horizontal surface.

13. The method according to claim 11, wherein the plurality of piping components further comprise ASME Code B31.3 compliant components.

14. The method according to claim 11, wherein the system test gauge is rated at 0-600 psi both for gas pressure measurement and for liquid pressure measurement.

15. The method according to claim 11, wherein the percentage of the cumulative pressure is 50%.

16. A method of operating a pressure testing assembly to perform a pneumatic pressure test on a test subject, the pressure testing assembly comprising:
a manifold comprising:
a pneumatic pressure testing path comprising a plurality of piping components configured to join, in gaseous fluid communication,
a regulator having a high-pressure gauge, a low-pressure gauge, and a source gas inlet,
a ball valve,
system test gauge,
a vent valve,
a system test port, and
a system relief valve;
a hydrostatic pressure testing path comprising a subset of the plurality of piping components configured to join, in liquid fluid communication,
a spare port,
the system test gauge,
the vent valve,
the system test port,
the system relief valve, and
the ball valve; and
a case configured to mechanically carry the manifold;
the method comprising the steps of:
receiving, using a cartridge valve coupling, the system relief valve;
closing the ball valve;
connecting in gaseous fluid communication the system test port to the test subject;
receiving, using the source gas inlet of the regulator, an input gas;
iteratively increasing, by a step pressure, a cumulative pressure of the input gas at the system test gauge until
upon leak detection at the cumulative pressure using the system test gauge, reducing the cumulative pressure by a percentage of the cumulative pressure, and
upon the cumulative pressure equaling a test pressure, holding the test pressure for a time step.

17. The method according to claim 16 further comprising mechanically stabilizing the case of the pressure testing assembly upon a horizontal surface.

18. The method according to claim 16, wherein the pressure testing assembly further comprises a flexible hose; the method further comprising conveying, using the flexible hose, the input gas to the source gas inlet of the regulator.

19. The method according to claim 16, wherein the step pressure is 100 psig.

20. The method according to claim 19, wherein the percentage of the cumulative pressure is 50%.

* * * * *